(12) United States Patent
Lawrence et al.

(10) Patent No.: US 7,386,715 B2
(45) Date of Patent: *Jun. 10, 2008

(54) SYSTEM AND METHOD FOR REPLICATING DATA IN A DISTRIBUTED SYSTEM

(75) Inventors: Neil David Lawrence, West Sussex (GB); Christopher Michael Bishop, Cambridge (GB); Antony Ian Taylor Rowstron, Cambridge (GB); Michael James Taylor, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/049,018

(22) Filed: Feb. 1, 2005

(65) Prior Publication Data

US 2005/0144538 A1    Jun. 30, 2005

Related U.S. Application Data

(63) Continuation of application No. 09/999,566, filed on Nov. 1, 2001, now Pat. No. 6,889,333.

(51) Int. Cl.
*G06F 15/16* (2006.01)
*G06F 13/00* (2006.01)

(52) U.S. Cl. .............................. 713/100; 713/1; 713/2; 707/10; 707/200; 707/201; 707/202; 707/203; 707/204

(58) Field of Classification Search ................... 713/1, 713/2, 100; 707/10, 200–204
See application file for complete search history.

(56) References Cited

U.S. PATENT DOCUMENTS

| | | | |
|---|---|---|---|
| 5,388,255 A | 2/1995 | Pytlik et al. ................... 70/74 |
| 5,703,939 A | 12/1997 | Bushnell ................. 379/112.05 |
| 5,796,999 A | 8/1998 | Azagury et al. ............... 707/10 |
| 5,924,096 A | 7/1999 | Draper et al. .................. 707/10 |
| 5,946,689 A * | 8/1999 | Yanaka et al. ................. 707/10 |
| 5,995,980 A | 11/1999 | Olson et al. ................. 707/201 |
| 6,044,381 A | 3/2000 | Boothby et al. ............. 707/201 |
| 6,144,839 A | 11/2000 | Foladare et al. ........... 340/7.48 |
| 6,223,187 B1 | 4/2001 | Boothby et al. ............. 707/201 |
| 6,243,715 B1 | 6/2001 | Bogantz et al. ............. 707/201 |
| 6,389,423 B1 | 5/2002 | Sakakura ...................... 707/10 |
| 6,412,017 B1 | 6/2002 | Straube et al. .............. 719/313 |

(Continued)

OTHER PUBLICATIONS

Bishop, C.M., in *Neural Networks for Pattern Recognition*, Oxford University Press, 1995, 4 pages.

(Continued)

*Primary Examiner*—Abdelmoniem Elamin
(74) *Attorney, Agent, or Firm*—Woodcock Washburn LLP

(57) ABSTRACT

It is common in distributed systems to replicate data. In many cases, this data evolves in a consistent fashion, and this evolution can be modeled. A probabilistic model of the evolution allows us to estimate the divergence of the replicas and can be used by the application to alter its behavior, for example, to control synchronization times, to determine the propagation of writes, and to convey to the user information about how much the data may have evolved. In this paper, we describe how the evolution of the data may be modeled and outline how the probabilistic model may be utilized in various applications, concentrating on a news database example.

20 Claims, 7 Drawing Sheets

U.S. PATENT DOCUMENTS

| | | |
|---|---|---|
| 6,516,327 B1 | 2/2003 | Zondervan et al. ......... 707/200 |
| 6,575,901 B2 | 6/2003 | Stoycos et al. ............. 600/300 |
| 6,640,242 B1 | 10/2003 | O'Neal et al. .............. 709/206 |
| 6,643,669 B1 | 11/2003 | Novak et al. ............... 707/201 |
| 6,711,575 B1 | 3/2004 | Applewhite et al. ........ 707/100 |
| 6,745,209 B2 | 6/2004 | Holenstein et al. ......... 707/203 |
| 6,889,333 B2* | 5/2005 | Lawrence et al. .......... 713/400 |
| 7,257,134 B2* | 8/2007 | Yik et al. ................... 370/509 |

OTHER PUBLICATIONS

Cho, J. et al., "Estimating Frequency of Change," Research Paper, Stanford University, 2000, 1-21 and Appendix 1-3.

Cho, J. et al., "Synchronizing a Database to Improve Freshness," *Proceedings 2000 ACM International Conference on Management of Data (SIGMOD)*, Dallas, Texas, May 16-18, 2000.

Fielding, R. et al., HTTP Specifications and Drafts, Hypertext Transfer Protocol—HTTP/1.1—Draft Standard RFC 2616 (Postscript), http://www.w3.org/Protocols/Specs.html, 1999.

Gal, A. et al., "Managing Periodically Updated Data in Relational Databases: A Stochastic Modeling Approach," http://www.acm.org/jacm/Upcoming.html (no publication date available), 45 pages.

Mardia, K.V. et al., *Directional Statistics*, John Wiley and Sons, Chichester, West Sussex, 2$^{nd}$ Edition, 1999, 14 pages.

Yu, H. et al., "A Scalable Web Cache Consistency Architecture," *Proceedings ACM SIGCOMM '99*, Boston, MA, USA, Sep. 1999, 163-174.

Yu, H. et al., "Design and Evaluation of a Continuous Consistency Model for Replicated Services," *Fourth Symposium on Operating System Design and Implementation (OSDI)*, Oct. 23-25, 2000, 305-318.

* cited by examiner

| Classification | Staleness (mins) | | Reduction | Number of synchronisations for equivalent staleness |
|---|---|---|---|---|
| | Uniform | Adaptive | | |
| Business | 123.3 | 87.9 | 40% | 4 (130.2) |
| Entertainment | 113.7 | 78.6 | 45% | 4 (119.4) |
| Health | 131.8 | 94.6 | 39% | 5 (125.4) |
| UK | 120.2 | 109.5 | 10% | 5 (127.2) |
| All | 122.3 | 105.2 | 16% | 5 (132.9) |

Figure 7

SYSTEM AND METHOD FOR REPLICATING DATA IN A DISTRIBUTED SYSTEM

CROSS REFERENCE TO RELATED APPLICATIONS

This application is a continuation of U.S. patent application Ser. No. 09/999,566, filed Nov. 1, 2001, now U.S. Pat. No. 6,889,333, entitled "System and Method for Replicating Data In A Distributed System.

FIELD OF THE INVENTION

The present invention relates generally to the field of computing. More particularly, the invention relates to a system and method for replicating databases in a distributed environment.

BACKGROUND OF THE INVENTION

In distributed systems, the replication of shared mutable data has been widely studied. When mutable data is replicated there is a need to consider the consistency model used to control the level of divergence of the different replicas as well as transmission costs to synchronize the divergent replicas. Many replication systems provide synchronous replication in which, at a predefined interval, the divergent systems are brought to a desired consistency. At the given interval, such systems generally perform the desired synchronization without accounting for the degree of change or the amount of data traffic on the communication channel, etc. However, communication channel costs may be significant. For example, during peak traffic times, carriers may charge higher rates for use of a communication infrastructure.

On the other hand, using preset intervals to replicate the data may cause data to become unacceptably stale in the system that is attempting to maintain consistency. This is so because in many applications, the rate of change to data is not constant. That is, data changes may have periods of quiescence followed by bursts of data changes related to the underlying application whose data is being captured. For example, data related to stock markets will tend to experience significant changes while stock exchanges are open and insignificant changes while stock exchanges are closed. However, by synchronizing the data in fixed intervals, fewer synchronization events may occur during peak changes and unnecessary synchronizing events may occur when data is essentially unchanged.

A system that provides for consistency between replicated databases and provides replication or synchronization that is based on the rate of change of the data as well as connection issues is desirable.

SUMMARY OF THE INVENTION

In view of the foregoing, there is a need for a system that overcomes the drawbacks of the prior art. The present invention addresses these shortcomings by modeling the rate of change to data in a database and using that model to replicate the data so that data consistency between a primary data set and a replica data set is increased for a given number of replication or synchronization events.

By modeling the rate of change to data of interest to an application, synchronization events can be selected that provide for control over the staleness or freshness of the data in a replica data set. The synchronization events may be selected such that more frequent synchronization events occur during time intervals having a higher rate of change of data in the original data set. Alternatively, synchronization events may be selected such that fewer synchronization events are required to provide the same relative freshness of data as would be required to synchronize the data at regular intervals by eliminating synchronization events during periods of relatively low rates of change of the data.

Preferably the rate of change is modeled by way of a probabilistic model such as a histogram. The model captures changes to the primary database over a predetermined periodicity of the data such as daily, weekly, monthly, etc., then uses the periodicity to provide an estimate of the expected rate of change in future periods.

The synchronization may be between a remote computer and a local computer, a client and a server, over a local area network, a wide area network, an Internet, an intranet, and so on. The available bandwidth and the cost of that bandwidth between the primary and replica databases may be used to select synchronization events.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 7 is a set of test results showing the advantages of the invention in replicating databases or data sets; and

DETAILED DESCRIPTION OF THE INVENTION

Overview

Distributed applications commonly require data to be replicated across platforms such as a client and a server. For example, a handheld computing device may replicate e-mail clients or calendar functions from an e-mail server, or such client computers may replicate portions of a web site for off line use. However, communication bandwidth between the client and the server places a cost on the transfer of replica data from the server to the client. Accordingly, users of such systems must make a trade off between the relative freshness of the replicated data and the frequency of replication updates. The present invention provides a system and method for intelligently selecting the replication update times. By probabilistically modeling the rate of change to the data to be replicated, applications can select replication update times that maximize the freshness of the replicated data for a given number of replication updates. Such models provide a statistical model of how relevant data on the server changes over a given period, e.g., daily, weekly, etc., so that the model can be used as a predictor of future change to the server data. As a result, applications can select update times from the model such that a replication update may be performed after periods of high rates of changes to the server data.

Figure 1:
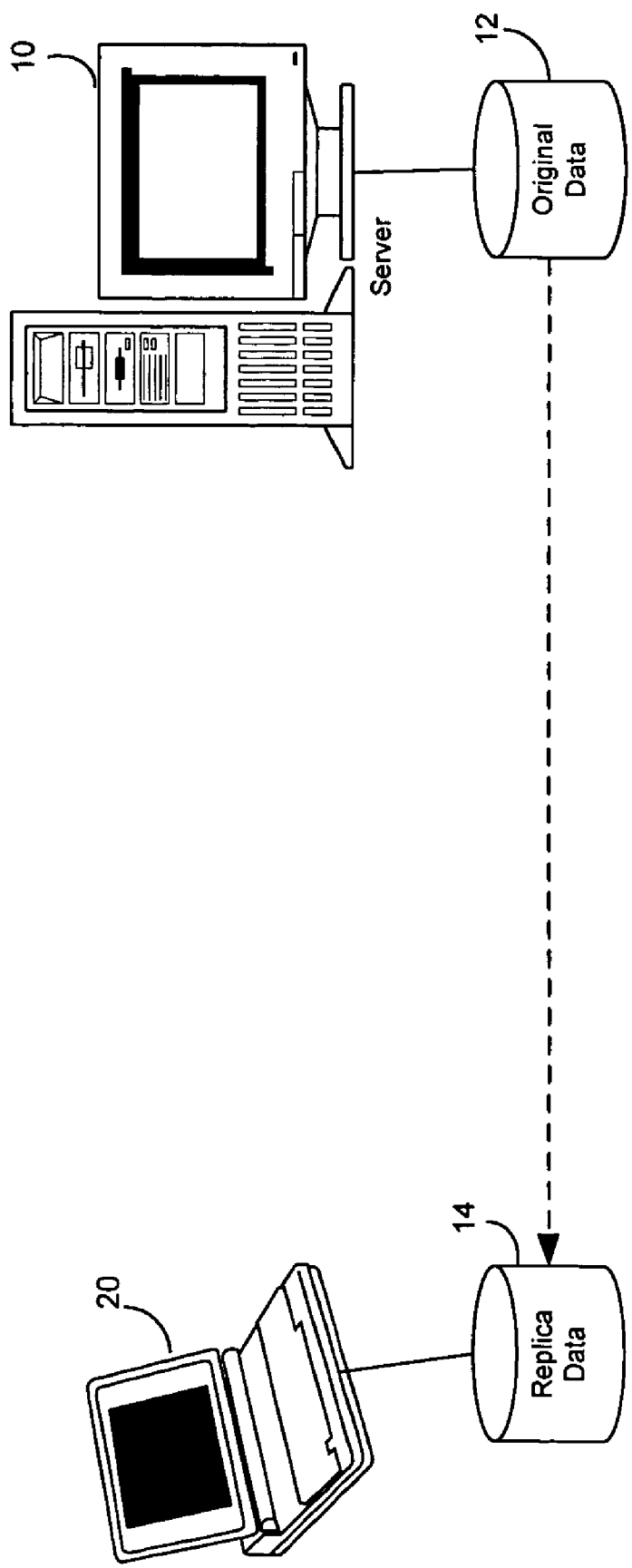
FIG. 1 is a diagram of an exemplary system in which aspects of the invention may be implemented to replicate a database.

The primary structure underlying the invention is illustrated in FIG. 1. Essentially, a database 12 contains data, some or all of which is needed by computer 20 and maintained by computer 10. In some architectures computer 20 may access database 12 directly. Alternatively, computer 20 may maintain a replica database 14 that contains copies of some or all of the data stored in original database 12. Maintaining replicated versions of database 12 poses many issues. One primary issue is that unless the replication of original database 12 is nearly instantaneous (i.e., for every change in the data in database 12 there is an instantly corresponding change in database 14), database 14 will not be completely consistent with database 12. The acceptable latency of consistency will vary greatly depending on a number of issues, such as criticality of the data, the frequency with which computer 20 consumes the data, cost of replication events, and so on.

As described more fully below, the invention provides a function based on the past rates of change of data in original database 12 to provide an inference about the future rate of change of data in original database 12. That inference is then used to provide replication or synchronization events. The inference may be used in some instances to provide more frequent replication during time periods when database 12 is likely to have a higher rate of change. Alternatively, the inference may be used to select replication or synchronization events during periods of quiescence when the database rate of change is at its nadir. The choice will be dependent on a given application and cost trade-offs.

Various applications are used herein to explain the invention, such as synchronizing a mobile news data base with a news server, e.g., synchronizing a handheld computer with an Internet news server, synchronizing a mobile e-mail client with a central e-mail server, and replicating web pages from a web server to various web caches. However, these applications are merely examples that illustrate the invention and should not be construed as limitations on the fundamental invention of modeling the rate of change of data to select replication or synchronization event times.

Computing Environment

Computers 10 and 20 and their respective databases are generally part of a distributed computing environment. There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

The Internet refers commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 1, computer 20 can be thought of as the client and computer 10 can be thought of as the server where server 10 maintains the data that is then replicated in the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Illustrative Computer Network Environment

Figure 2:
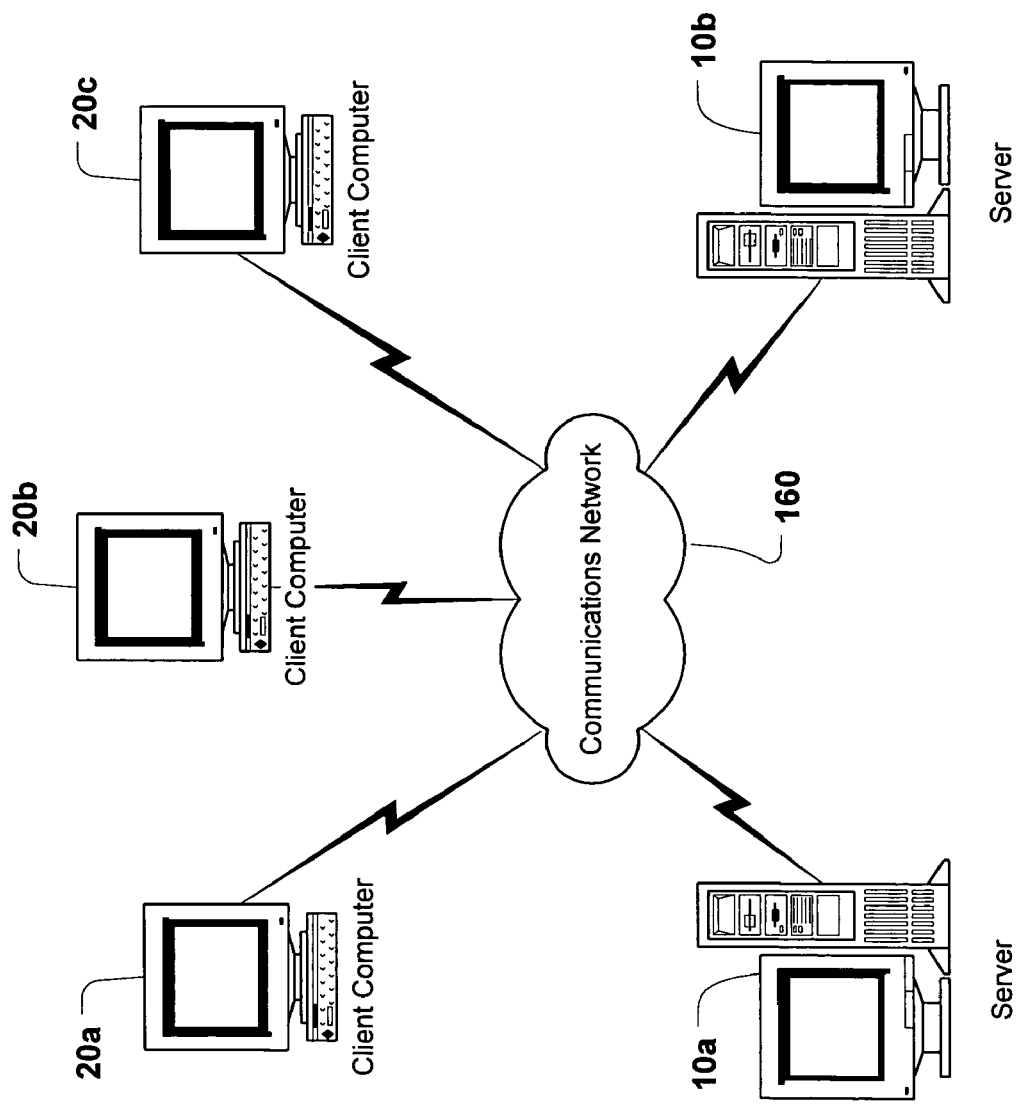
FIG. 2 is an example of a computer network wherein aspects of the present invention may be employed.

FIG. 2 illustrate how the computers of FIG. 1 may be distributed in network environment. In general, the computer network may comprise both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the present invention can be implemented with a variety of network-based architectures, and thus should not be limited to the example shown. The present invention will now be described in more detail with reference to an illustrative implementation.

Figure 3:
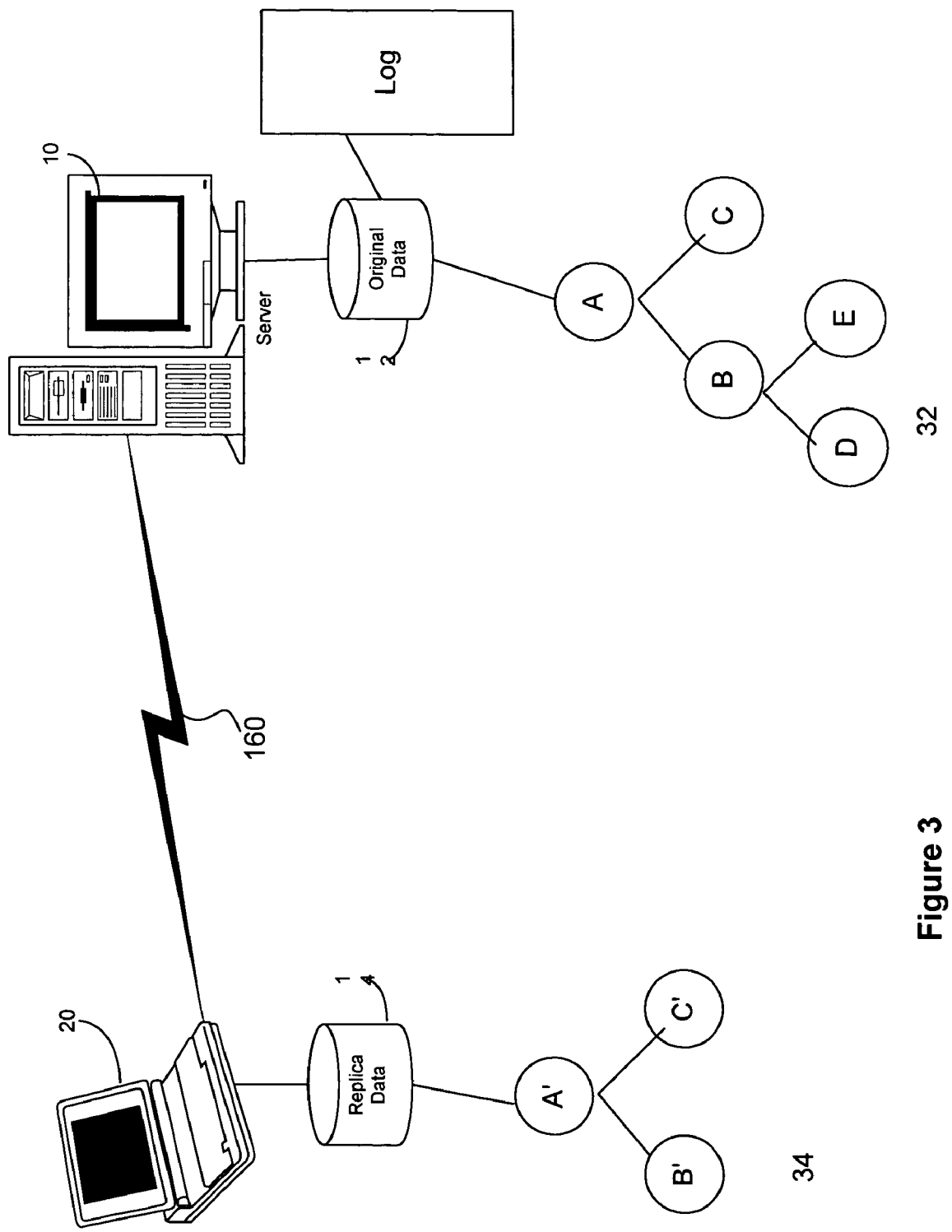
FIG. 3 is a more detailed illustration of the operation of the present invention to synchronize a database or data sets across a computer network.

FIG. 3 illustrates computers 10 and 20 and their respective databases 12 and 14. Computers 10 and 20 communicate over communication network 160 as described above with respect to FIG. 2. FIG. 3 further illustrates data structures 32 and 34 where data structure 32 is the data structure maintained by original database 12 and data structure 34 is the data structure maintained by the replica database 14. Data structure 32 contains data sets A, B, C, D, and E, which may be tables, row sets, or any other common data grouping. Data structure 34 contains data sets A', B', C' which are replica data sets of corresponding data sets A, B, and C in the original data structure 32. Hence, database 14 may be configured to replicate all of database 12 or only selected data sets maintained by database 12 as illustrated here.

Figure 4:
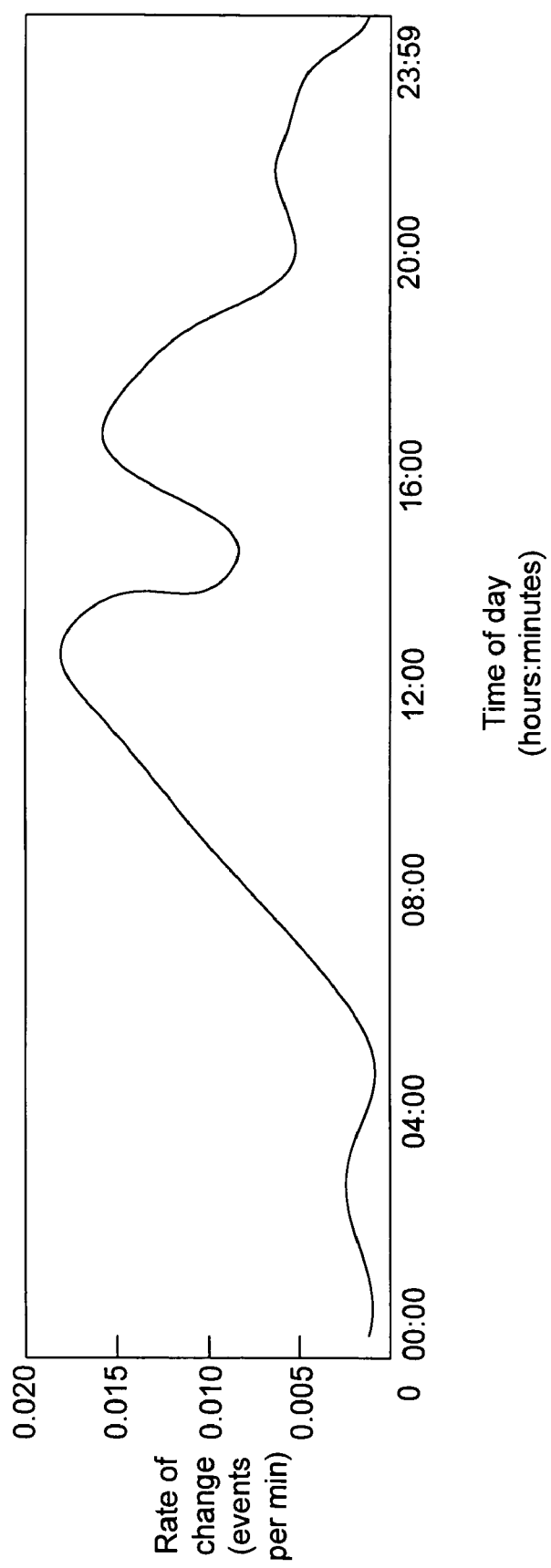
FIG. 4 is an example graph of the rate of change of data in a database.

In addition to the data structure 32, database 12 maintains a log that records activity on database 12, keeping track of events such as the time that data was accessed, which rows and tables were accessed and/or changed, and so on. By using the log to measure which data sets A, B, C, D, and E of data structure 32 were modified, a rate of change of data sets can be measured over time. FIG. 4, for example, illustrates how data may change for a given data set for a selected 24-hour period. In accordance with the present invention, such past measurements are used to form a model to infer how data is likely to change in the future (or at least infer periods of high rates of change and periods of low rates of change).

Figure 5:
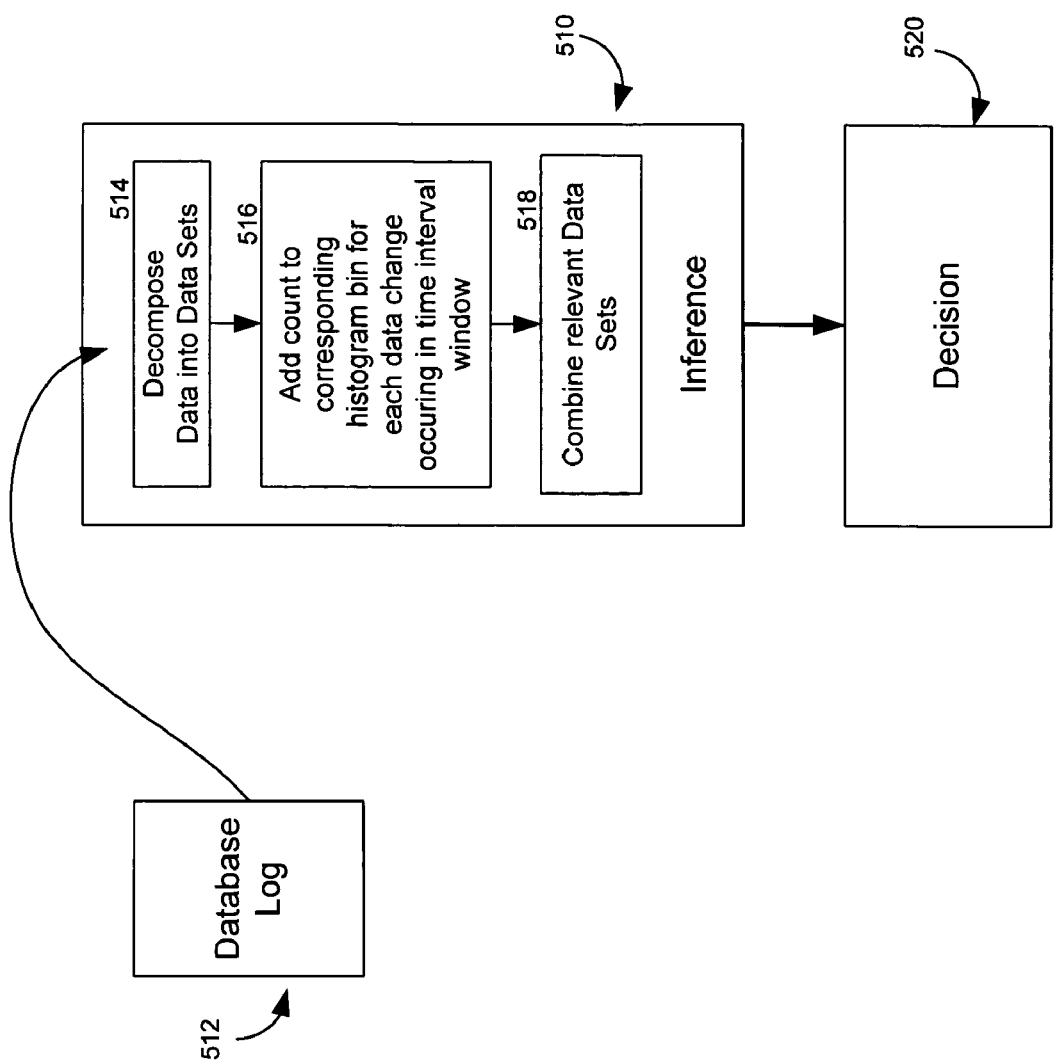
FIG. 5 is a block diagram illustrating the operation of the system of the present invention.

One approach is to employ probabilistic models that capture how a data structure or data set evolves in time. These probabilistic models allow the application to estimate the number of updates that are likely to have been performed on the data structure, or data set, during a specified time period, for example between the last time a synchronization event was performed and the current time. The application can then use this estimate to adapt to the data structures' evolution by, for example, controlling when synchronization events should occur, alerting the user to divergence, or controlling when updates to the shared data are propagated. The overall process is illustrated in FIG. 5.

The generation of a single probabilistic model that captures the evolution of the other replicas, is referred to as inference (box 510). Inference box 20, a log file 512 indicating changes to data in the original database (i.e., database 12) is processed. The log file is partitioned by various data sets of interest (box 514). The changes to data within a given data set is counted in a corresponding histogram bin (box 516). For example, in a histogram having bin time intervals of 15 minutes, the system would count changes occurring from 12 AM to 12:15 AM as changes within the same bin. Once the histogram is formed for a given data set, one or more histograms may be combined to form a composite histogram (box 518). This process may be repeated a predetermined number of times over the periodicity of the data. More samples should increase the accuracy of the model.

The application then makes decisions (box 54) based upon the information contained within this single model. This partition of the problem into two stages of inference (box 510) and decision (box 520) enables the application to a wide variety of applications. For example, one application may have decisions that are designed to minimize latency (i.e., the staleness of the replica data) and may choose to synchronize during or immediately after periods of high inferred rates of change; whereas other applications may be designed to minimize cost and hence may choose to synchronize during periods of minimum rates of change.

The inference stage is decomposed into the generation of models representing the evolution of the data structure, or data sets, and the subsequent combining of these models as requested by the application. In the inference stage, a general purpose tool can be used to create the probabilistic models, and combine them, whilst the decision stage is specific to each application.

The probabilistic models are generated by a tool, which preferably uses a log of descriptions of the operations performed on the shared data structure or data set. For each update to the data structure, the log contains: information about the operation, the part of the data structure that was affected, the time when the operation was performed and an identifier representing the source of the update (for example, a user id). A description of the data structure and its different data sets is also required by the tool, which allows each data set of the data structure to be modeled independently. Once a set of probabilistic models have been created, these can be updated dynamically as new updates are performed.

As a simple example of the data structure decomposition, consider an address database application. Each entry within the database is marked as either being a personal contact or as a business contact. This data structure can be thought of as being composed of two parts, the personal and the business parts, and two models can be generated and provided to the application. A model for the entire address database could then be generated by combining the two models. A further sub-division could exist within the database with, perhaps, the personal database being divided into family and friends. Separate probabilistic models can then also be generated for each of these sub-divisions and again composed.

The application preferably creates the logs, provides the information about the decomposition of the data structure, and performs the decisions based upon the information provided by the models.

Probabilistic Modeling

Learning of the probabilistic models can be automated using model selection techniques, and the models may also be changed over time as more updates are made to the database. A probabilistic model is a particularly powerful representation as such models may be combined in a straightforward and principled manner. This means that the data structure can be decomposed (e.g., into different data sets) and each part modeled individually, as can different sources of data updates. For example, in the address database application, there could be separate models for the secretary and the owner of the address book, reflecting their particular patterns of updates. Hence, when the address book is replicated for the owner's use, the probabilistic model generated can describe how the secretary's copy evolves.

The probabilistic model is a prediction of future behavior based on the past. The true evolution of the database may not be consistent with the model. Even if the model is correct, its probabilistic nature means that its individual predictions can err, even if in general it is accurate. As a result, the user interface wherein synchronization events are selected should suggest and advise rather than constrain and command.

The System

The System is preferably composed of a tool for creating the probabilistic models, and a library for use in the application for merging the probabilistic models. These models capture the rate at which the operations are performed, and how that rate changes over time. Therefore, the time at which an update to the data structure occurs is the primary information required to create the models. The other information in the log allows multiple models to be created, based on the part (e.g., a data set) of the data structure being updated, or on the user performing the update. In order to achieve this, the tool pre-processes the log, creating a separate log for each entity to be modeled. A probabilistic model is then created for each of these sub-logs independently, and this is now described.

There are a number of factors that effect the creation of the models. For example, the periodicity of the data has to be determined (e.g., hourly, daily, weekly, monthly and so forth). This periodicity becomes the period over which the rate of change is modeled.

One modeling technique contemplated by the invention creates histogram-based models. Such models may be parameterized by widths and starting points for the bins. All the parameters of the model can be learned from the information contained within the log. It is noted that there are many alternative forms of probabilistic models that can be used. For example, wrapped mixtures of Gaussians and circular normals may be used in place of histogram-based models. Other models will be apparent to those of ordinary skill in the art in combination with the techniques described herein.

For each probabilistic model the correct parameters need to be established, and these control the model complexity. The main consideration in the selection of the model complexity is its generalization ability. In other words, a model preferably not only describes well the updates upon which it is based, but also will describe future updates. In the address book example above, where the events modeled are updates of the database, if a histogram model that is selected has too many bins (i.e., a sampling interval window in which data changes are counted together), then every update would occur in a single bin. Such a model is unlikely to provide a good predictor of the evolution of the database because the model complexity is too high. At the other extreme, a histogram model with only one bin will predict a uniform distribution for the future updates. Such a model is also likely to be a poor predictor of the database's evolution.

There is obviously a 'happy medium' and this may be found through cross-validation of the model. Cross-validation involves splitting the log into a number parts, for example five. The first four parts are then used to construct a model with a particular parameterization and the fifth part is used to 'validate' the model. This involves computation of the histogram models likelihood of creating the validating data. The part that is used for validation and one of those used for construction is then inter-changed and the model is re-validated. This procedure is repeated five times so that each part of the data has been used to validate the model once giving five different scores. The validation scores are then combined, for example, by averaging, and the final score is associated with the parameters used for constructing the histogram's model. A range of parameterizations can be tested in this manner and the one with the highest score is then selected, and utilized to construct a model based on all the data, which is the final model.

Another factor determined during the cross-validation phase is the periodicity of the updates. A number of pre-programmed periodicities may be used such as: a daily cycle, a weekly cycle, weekdays separately generated from weekends, and Saturdays separately generated from Sundays, both of which are separately generated from weekends.

More pre-programmed periodicities can easily be added, such as hourly or monthly based periodicities. Note that the set of candidate models includes the uniform distribution, and so the performance of the system should be no worse than that of the uniform model, in the event that one of the pre-programmed periodicities is not appropriate.

A prior distribution is used, which can either be a uniform prior or, in some situations, there may be prior knowledge about when the updates arrive: The prior distribution may be combined with the generated model (e.g., the model determined from the log data) using Bayes's rule. For a histogram model, this prior distribution plays an important role of ensuring the final histogram model is non-zero at all points within its range, i.e., even when there are no observed points within a bin's range, the histogram has some residual value. The residual value of the histogram is a further cross-validated parameter. If there is no or little information about when the updates occur, this is valuable, because the model is initialized using the prior distribution and as more updates are observed, the model is refined to represent more accurately the underlying distribution of the updates. This process can be extended to allow more recent data to be more influential, thereby allowing the system to deal with non-stationary situations in which the distribution is itself evolving with time.

EXAMPLE

Mobile News Database

Recently, there has been a proliferation of applications that replicate information on mobile devices, such as the service provided by AvantGo (http://www.avantgo.com/). Such services allow mobile devices to store replicas of small news databases for access when the mobile device is disconnected. The mobile news database application provides, on a mobile device, a list and summary of the current news stories. Such mobile devices may have wireless connectivity which allow them to synchronize with the master news database. Generally the devices employ a pull model, where the device initiates the connection.

For example, the mobile device may be synchronized to a news service such as the BBC news service. The BBC publishes news articles to their web site 24 hours a day and each of the news items is classified under a category, such as sport, business, health and so forth. For every article appearing on the BBC News Web site over a three month period, the date and time of publication, and the subject of the news article was extracted to create a news database. The news database was treated as the original data structure, and the information gathered from the Web site was used to create the log required to generate the probabilistic models. The news database was decomposed into several parts, where each subject was treated as a separate part. All writes to the news database were considered as being performed by a single user. The mobile news database application allowed the user to select which parts of the news database they wished to have replicated on the mobile device.

The probabilistic models of the news database are created by the tool overviewed in the previous section. The mobile news database uses the probabilistic models to generate a visual cue in the application interface to allow a user to see the number of updates that are likely to have occurred to each part of the news database since the last synchronization. The application also uses the probabilistic models to control synchronization times between the device and the master news database. It is likely that, due to the cost of bandwidth, as well as the limited amount of bandwidth, the mobile devices will not be continuously connected. Therefore, the synchronization times have to be selected. This selection process is part of the decision stage.

One approach to choosing when the mobile device should synchronize would be to have a user specify the number of synchronization events per day they were willing to pay for, and these would occur uniformly during the day, for example once every four hours. The mobile news database makes an adaptive choice of when to synchronize. This adaptive choice trades-off between the cost of synchronization and the average staleness of the data, where staleness is defined as the time between an article appearing on the master news database and appearing on the device.

In order to calculate the synchronization times, it is necessary to formalize the user's requirements and calculate how to achieve them. In the mobile news database this is achieved either by setting the number of synchronization events per day to achieve a particular average staleness, or by allowing the user to set the number of synchronization events per day and then scheduling the synchronization times to minimize the staleness.

The user's preferences can be expressed in terms of a cost function, which represents mathematically what the user wants. In the news database problem, the simple cost function selected is one that represents the staleness of the news articles. In other words, the synchronization events should be selected so as to minimize the time that articles are available in the news database, but are not available on the mobile device. For every article, the staleness is the time from when the article was available but not in the replica on the mobile device.

The cost incurred from synchronizing at time $s_i$ may be mathematically expressed as:

$$C = \sum_{n=1}^{N} (s_i - u_n)$$

given that N articles have arrived since the last synchronization at times $u_i$ to $u_n$. An application may want to find a synchronization time that minimizes this cost. Unfortunately, without knowing when the updates will arrive, the application can only estimate the rate of arrival using the probabilistic model described above. Accordingly, the system can minimize the expected cost using inferences made by modeling.

Consider how the expected cost will depend on three ordered synchronization times $s_{i-1}$, $s_i$ and $s_{i+1}$ in Equation 2 below:

$$C(s_{i-1}, s_i, s_{i+1}) = \int_{s_{i-1}}^{s_i} \lambda(t)(s_i - t)dt + \int_{s_i}^{s_{i+1}} \lambda(t)(s_{i+1} - t)dt$$

where $\lambda(t)$ is a time varying function representing the estimated rate at which updates are occurring at the master news database, and is obtained from the probabilistic model.

The first term in Equation 2 is the expected cost that will be incurred when the application synchronizes at time $s_i$. Note the inclusion of the second term, which is the expected cost that will be incurred when the application synchronizes at time $s_{i+1}$. This cost also depends on $s_i$.

The application can now minimize the expected cost with respect to each $s_i$, given the neighboring synchronization events. This may be done through an iterative algorithm where passes are made through the proposed synchronization times optimizing each one in turn until convergence is achieved.

An alternative to minimizing staleness is to maintain the same level of staleness that could be achieved using the uniform approach, but to achieve this using fewer synchronization events per day. This has the benefit of reducing the number of messages required (potentially reducing the financial cost of using the system), and also has power savings implications.

Histogram Example

Figure 6:
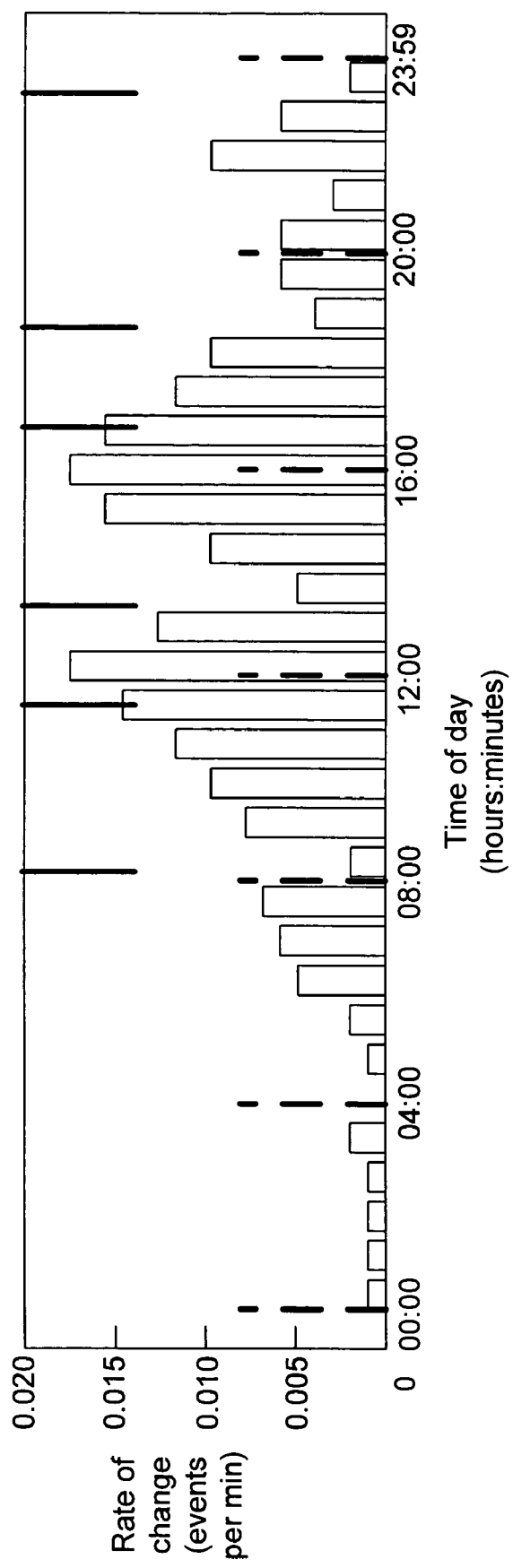
FIG. 6 is an example histogram illustrating a model of the rate of change of an exemplary database or data set.

FIG. 6 further illustrates aspects of the invention. The histogram based probabilistic model for weekdays for the business part of the news database is shown as boxes on the graph, generated using a set of past database updates. The system automatically determines the periodicity of the data. This can be done in a variety of ways but the simplest way is to fit several models having different periodicities (e.g., daily, weekly, and so on) and then to use cross-validation to select the most appropriate model. For the business part of the news database, the periodicity is a weekday and weekend periodicity. Therefore, the weekdays are mapped into one twenty-four hour period and a histogram is created to represent that twenty-four hour model as shown in FIG. 6 (there would be a separate model for the weekend which is not shown here). Six synchronization events per day are used in this example. The vertical solid lines in FIG. 6 show the optimal synchronization times to minimize the staleness. The vertical dotted lines in the lower half of the graph identify synchronization times as taken from a 'uniform' strategy that synchronizes every four hours.

The histogram of FIG. 6 may represent the processing of log data from data changes that occur with a profile similar to the profile illustrated in FIG. 4. However, FIG. 4 represents data changes over a single period. Many such periods may be used to form a histogram for use by an application.

FIG. 7 is a table of some results from a test news database application, showing the staleness achieved when each of the four named databases is replicated individually, and when they are all replicated. It shows the average time in minutes between an article becoming available on the master news database and appearing in the replica on the mobile device, for articles arriving during a period of test weekdays. The figures show the results when six synchronization events per day were used, with both the uniform and adaptive synchronization times. The uniform approach started at midnight, as is shown in FIG. 6 (notably, starting the uniform synchronization at other times does not materially impact the results). The percentage decrease in staleness for adaptive over uniform is shown. In the final column, the number of synchronization events required by the adaptive approach to achieve a similar average staleness of articles as with the six uniform synchronization events, with the observed average staleness shown in brackets afterwards.

EXAMPLE

Mobile Email Client

A second example of functionality of the system is with mobile email clients. In such systems, a central server is used to store email, and the mobile email client running on a mobile device synchronizes with the central email server. The mobile email client is similar to the mobile news database, and uses the probabilistic models to indicate to the user the likely divergence between the email cached on the mobile device and the central server, and to control when synchronization events should occur. These are calculated using a similar cost function to that used in the News Database example.

The system logs when email arrived (email folders updated). In this example, the system logged e-mail arrival for six Microsoft Exchange users over a predetermined time period, by using information held in the Exchange server. The probabilistic models were created automatically, with the system calculating the periodicity of the data being modeled. For the six users, four were modeled using a weekly periodicity, and the other two were modeled using a weekday/weekend periodicity.

The number of synchronization events was varied between 1 and 24 synchronization events per day. The results show clearly that regardless of the number of synchronization events per day, the average staleness of email is reduced.

Other Applications

The examples presented above are examples using delivery of messages to mobile devices such as handheld computers. However, the present invention has wide applicability. For example, the system could be used to synchronize web caches. Web caches have become an integral part of the World Wide Web. Caches are embedded within web browsers as well as throughout the general infrastructure of the web. Their role is to replicate web pages thereby reducing latency of web page access, bandwidth usage and web server load. The HTTP protocol provides support for web caches, allowing the life times of objects received to be explicitly set, and for fields providing explicit instructions to caches on how to treat a particular page.

Many web sites are automatically generated using tools that could generate logs of when the pages are updated. These logs could then be used by the invention to generate the probabilistic models of each page. The models could be carried within the HTTP protocol from the web server which generates the web page to web caches and browsers. Enabled web caches and browsers can then use these models to make decisions about when a cached page is still acceptable (under user specified parameters), and inform a user the likelihood that the page has been updated.

The examples used so far involve data that cannot be modified at the replica. The system also has applicability to systems that allow the replicas to be modified. For example, consider a calendar application, where a single user's calendar is replicated. There can be multiple people concurrently accessing and updating the calendar (for example a manager and their secretary). As with the mobile news database and mobile email reader, the calendar application can calculate synchronization times. More interestingly, the user interface can use the information to adapt, for example, and indicate appointment slots that are less likely to lead to conflicts when synchronization occurs. Also, potentially, the models can be used to provide just-in-time update propagation.

Consider an example wherein a secretary has access to a salesperson's calendar. The salesperson and the secretary are the only people who make appointments and the secretary works only weekdays. If, on a Saturday, the salesperson makes an appointment for the following week, this need not be propagated until Monday morning, when the secretary arrives. However, if on a Tuesday morning the salesperson makes an appointment for the next day this should be propagated immediately because the secretary will be booking appointments on the same day. If the same salesperson also makes an appointment on the Tuesday morning for a month in the future, this might not need to be propagated immediately because, for example, the secretary never makes appointments more than a week in advance. Using the models of how the data evolves, the write update's propagation can be delayed until the system thinks that by delaying any longer the chance of conflict increases significantly. Furthermore, the updates can be propagated in any order. Thus, the advantages of delaying propagation are that it may be possible to package the updates in packets more efficiently, saving cost and bandwidth, as well as the potential to delay until a cheaper communication medium becomes available.

The above description of preferred embodiments is not intended to implicitly limit the scope of protection of the following claims. Thus, for example, the modeling may be done on the server where the client configures the server to push the data to the client. Alternatively, the modeling may be done on the client where a log or similar information about the change in the rate of data is passed to the client. Except where they are expressly so limited, the following claims are not limited to applications involving news databases or e-mail servers. Rather the invention has been described to broadly illustrate how probabilistic models can be used to estimate replica divergence.

What is claimed is:

1. A method for synchronizing data, comprising:
receiving information indicative of a rate of change to data in a first data set;
dynamically selecting a time to synchronize at least a portion of data in a second data set with corresponding data in the first data set as a function of the information indicative of the rate of change.

2. The method as recited in claim 1, where the function comprises using a previous rates of change to data in the first data set.

3. The method as recited in claim 2, wherein the function comprises the use of a histogram.

4. The method as recited in claim 2, wherein the previous rates of change comprises a log to record the frequency of changes to data in the first data set.

5. The method as recited in claim 1, wherein the first data set is maintained by a local computer and the second data set is maintained by a remote computer.

6. The method as recited in claim 5, wherein the remote computer communicates with the local computer over a network.

7. The method as recited in claim 1, wherein the second data set is maintained by an application program.

8. The method as recited in claim 7, wherein the application program comprises one of a mobile news database, an e-mail client, and a web cache.

9. A computing apparatus, comprising:
a processor;
a second data set stored in a memory in communication with said processor;
a second memory in communication with said processor and storing computer instructions for receiving information indicative of a rate of change to data in a first data set; and
a third memory communication with said processor and storing computer instructions for dynamically selecting a time to synchronize at least a portion of data in the second data set with corresponding data in the first data set as a function of the information indicative of the rate of change.

10. The apparatus as recited in claim 9, where the function comprises using a previous rates of change to data in the first data set.

11. The apparatus as recited in claim 10, wherein the function comprises the use of a histogram.

12. The apparatus as recited in claim 10, wherein the previous rates of change comprises a log to record the frequency of changes to data in the first data set.

13. The apparatus as recited in claim 9, wherein the first data set is maintained by a local computer and the second data set is maintained by a remote computer.

14. The apparatus as recited in claim 13, wherein the remote computer communicates with the local computer over a network.

15. The apparatus as recited in claim 9, wherein the second data set is maintained by an application program.

16. A computer-readable storage medium bearing computer-readable instructions for synchronizing data, comprising:

computer-readable instructions for receiving information indicative of a rate of change to data in a first data set; and computer-readable instructions for dynamically selecting a time to synchronize at least a portion of data in a second data set with corresponding data in the first data set as a function of the information indicative of the rate of change.

17. The computer-readable medium as recited in claim 16, where the function comprises using a previous rates of change to data in the first data set.

18. The computer-readable medium as recited in claim 17, wherein the function comprises the use of a histogram.

19. The computer-readable medium as recited in claim 17, wherein the using previous rates of change comprises recording in a log the frequency of changes to data in the first data set.

20. The computer-readable medium as recited in claim 16, comprising maintaining the first data set on a local computer and maintaining the second data set on a remote computer.

* * * * *